United States Patent
Nippa et al.

(10) Patent No.: US 7,215,851 B2
(45) Date of Patent: May 8, 2007

(54) SCHEMES FOR CONTROLLING OPTICAL SIGNALS IN OPTICALLY FUNCTIONAL WAVEGUIDE STRUCTURES

(75) Inventors: David W. Nippa, Dublin, OH (US); Richard W. Ridgway, Westerville, OH (US); Steven M. Risser, Reynoldsburg, OH (US); Dirk Schoellner, Columbus, OH (US); Louis P. Vassy, New Albany, OH (US)

(73) Assignee: Optimer Photonics, Inc., Columbus, OH (US)

( * ) Notice: Subject to any disclaimer, the term of this patent is extended or adjusted under 35 U.S.C. 154(b) by 10 days.

(21) Appl. No.: 11/268,316

(22) Filed: Nov. 7, 2005

(65) Prior Publication Data

US 2006/0056768 A1 Mar. 16, 2006

Related U.S. Application Data

(63) Continuation of application No. PCT/US05/11003, filed on Mar. 31, 2005.

(60) Provisional application No. 60/560,918, filed on Apr. 9, 2004.

(51) Int. Cl.
*G02B 6/26* (2006.01)
*G02B 6/42* (2006.01)

(52) U.S. Cl. .......................... 385/40; 385/14; 385/131

(58) Field of Classification Search ................... None
See application file for complete search history.

(56) References Cited

U.S. PATENT DOCUMENTS

| | | |
|---|---|---|
| 5,533,151 A | 7/1996 | Leonard |
| 5,729,641 A | 3/1998 | Chandonnet et al. |
| 5,854,866 A | 12/1998 | Leonard |
| 5,862,276 A | 1/1999 | Karras |
| 6,353,690 B1 * | 3/2002 | Kulishov ................. 385/10 |
| 6,449,404 B1 | 9/2002 | Paiam |
| 6,535,672 B1 | 3/2003 | Paiam |
| 6,687,425 B2 * | 2/2004 | Ridgway et al. ............. 385/14 |
| 6,782,149 B2 * | 8/2004 | Ridgway et al. ............. 385/11 |

(Continued)

OTHER PUBLICATIONS

Weisstein, Eric W., Kerr Effect, Wolfram Research, http://scienceworld.wolfram.com/physics/KerrEffect.html.*

(Continued)

*Primary Examiner*—Frank G. Font
*Assistant Examiner*—Erin D. Chiem
(74) *Attorney, Agent, or Firm*—Dinsmore & Shohl LLP

(57) ABSTRACT

Methods of attenuating, delaying the phase, and otherwise controlling an optical signal propagating along a waveguide are provided. According to one method, a variable optical attenuator structure is provided comprising a waveguide core, a cladding, an electrooptic polymer, and a set of control electrodes. The core, the cladding, and the electrooptic polymer are configured such that an increase in the index of refraction of the polymer causes a substantial portion of an optical signal propagating along the waveguide core to couple into a relatively high index region of the electrooptic polymer above the waveguide core, so as to inhibit return of the coupled signal to the waveguide core. Another embodiment of the present invention introduces a phase delay in the coupled optical signal and permits return of the coupled signal to the waveguide core. An additional embodiment contemplates the use of a ridge waveguide structure to enable control of the optical signal. Additional embodiments are disclosed and claimed.

20 Claims, 9 Drawing Sheets

U.S. PATENT DOCUMENTS

| | | |
|---|---|---|
| 6,785,435 B2 * | 8/2004 | Ridgway et al. ............... 385/14 |
| 6,795,597 B2 * | 9/2004 | Ridgway et al. ............... 385/11 |
| 6,853,758 B2 * | 2/2005 | Ridgway et al. ................ 385/2 |
| 6,931,164 B2 | 8/2005 | Risser et al. |
| 6,931,192 B2 * | 8/2005 | Ridgway et al. ............ 385/129 |
| 2001/0046363 A1 | 11/2001 | Purchase et al. |
| 2003/0059189 A1 * | 3/2003 | Ridgway et al. ............ 385/129 |
| 2003/0169958 A1 | 9/2003 | Ridgway et al. |
| 2003/0174982 A1 | 9/2003 | Ridgway et al. |
| 2004/0131303 A1 | 7/2004 | Nippa et al. |
| 2005/0053324 A1 | 3/2005 | Ridgway |
| 2005/0158050 A1 | 7/2005 | Ridgway |
| 2005/0226547 A1 | 10/2005 | Ridgway |

OTHER PUBLICATIONS

Ridgway et al., Fast VOA employing electrooptically-clad silica waveguide, Organic Photonic Materials and Devices VII, Apr. 2005, pp. 72-79, Proc. of SPIE vol. 5724, Bellingham, WA.

* cited by examiner

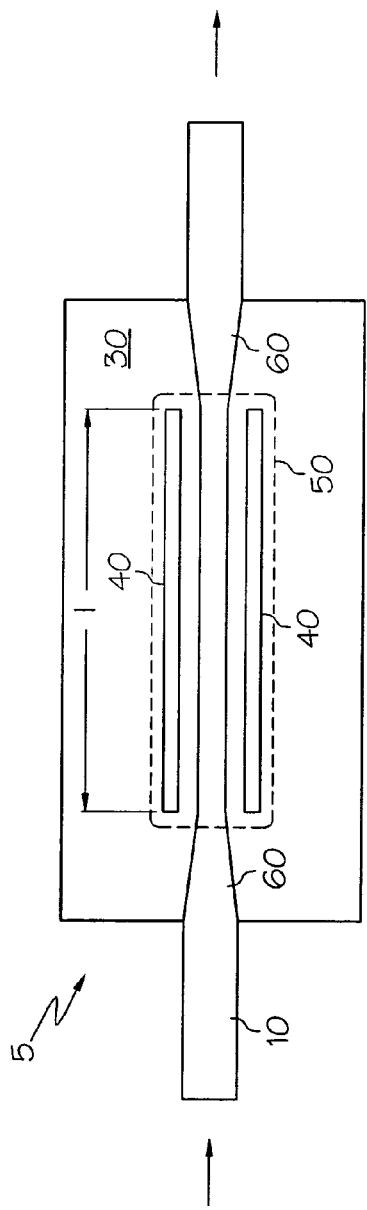
FIG. 6
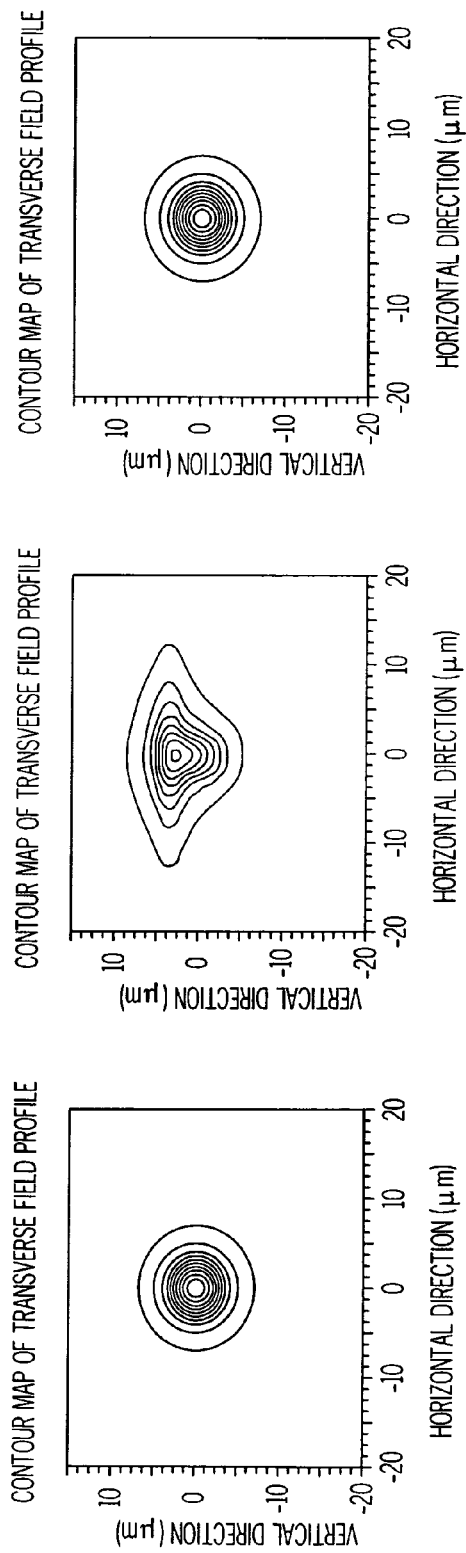
FIG. 6A
FIG. 6B
FIG. 6C

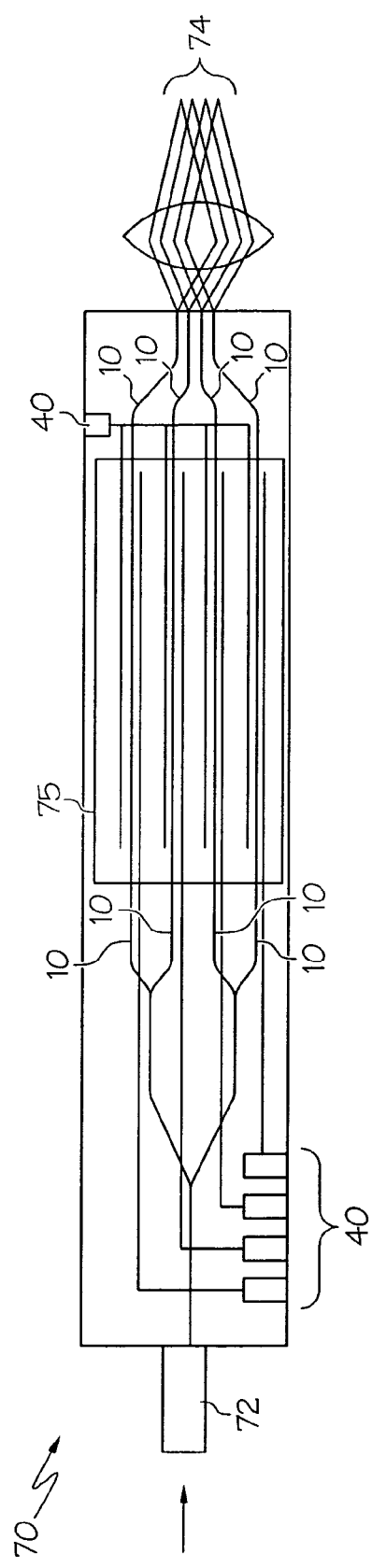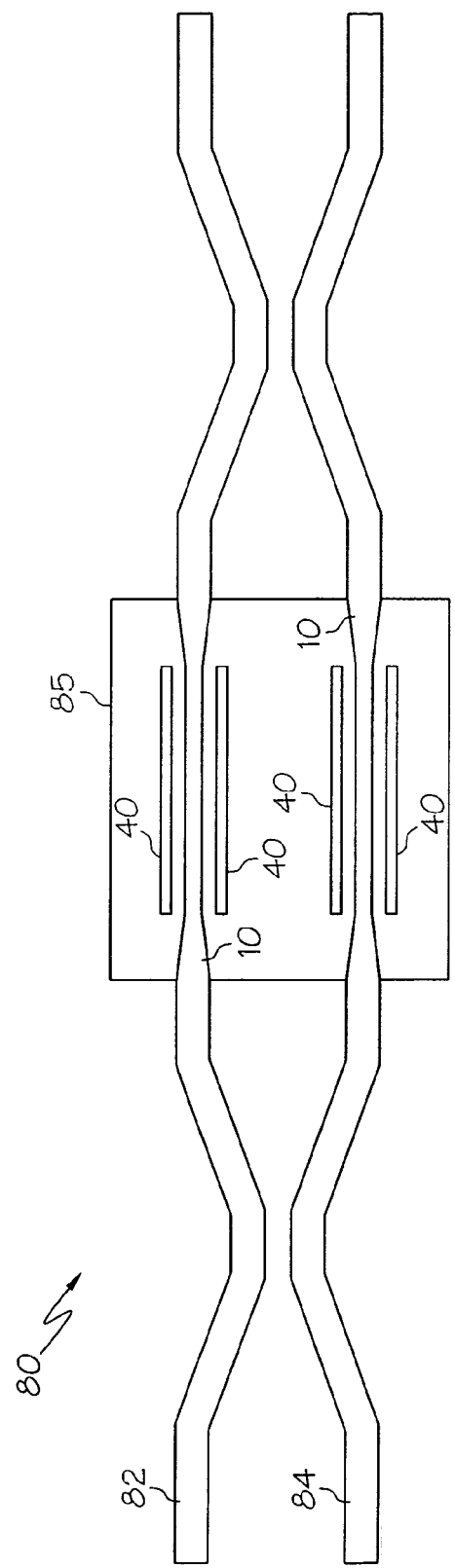

SCHEMES FOR CONTROLLING OPTICAL SIGNALS IN OPTICALLY FUNCTIONAL WAVEGUIDE STRUCTURES

CROSS-REFERENCE TO RELATED APPLICATIONS

The present application is filed under 35 U.S.C. 111(a) as a continuation of international patent application no. PCT/US2005/011003 (OPI 0015 PB filed Mar. 31, 2005), which international application designates the United States and claims the benefit of U.S. Provisional Application Ser. No. 60/560,918 (OPI 0015 MA), filed Apr. 9, 2004. The present application is also related to U.S. patent application Ser. No. __/____. (OPI 0015 N2), which application also claims the benefit of the above-noted international application.

BACKGROUND OF THE INVENTION

The present invention relates to the manipulation of optical signals traveling in a waveguide and, more particularly, to the control of an optical signal propagating along a waveguide structure through suitable design and manipulation of an optically functional polymer region incorporated in the waveguide structure.

BRIEF SUMMARY OF THE INVENTION

In accordance with one embodiment of the present invention, a method of attenuating an optical signal propagating along a waveguide is provided. According to the method, a variable optical attenuator structure is provided comprising a waveguide core, a cladding, an un-poled electrooptic polymer, Kerr Effect electrooptic polymer, and a set of control electrodes. The core, the cladding, and the electrooptic polymer are configured such that an increase in the index of refraction of the polymer causes a substantial portion of an optical signal propagating along the waveguide core to couple into a relatively high index region of the electrooptic polymer and does not return to the waveguide core. The variable optical attenuator structure is operated at a temperature at which chromophores of the un-poled electrooptic polymer are mobile. To control attenuation, the DC driving voltage is varied at the operating temperature between a maximum value sufficient to increase the index of refraction of the polymer and a minimum value where the electrooptic polymer tends towards a less oriented state.

In accordance with another embodiment of the present invention, a method of controlling the phase of an optical signal is provided. According to the method, the high index region of the electrooptic polymer is configured to introduce a phase delay in the coupled optical signal and the coupled portion of the optical signal returns to the waveguide core.

In accordance with yet another embodiment of the present invention, a method of controlling an optical signal is provided where the un-poled electrooptic polymer defines a height dimension h and is bound on opposite ends of the height dimension h by the waveguide core and the cladding. The un-poled electrooptic polymer is configured to define an index of refraction that varies from an un-coupled value $n_{EO}$ to a coupled value $n_{EO}'$ under application of a suitable electric field generated by the control electrodes. The un-coupled index value $n_{EO}$ is less than a refractive index $n_{CORE}$ of the waveguide core. The coupled index value $n_{EO}'$ is greater than the un-coupled refractive index value $n_{EO}$ and an index of refraction $n_{CLAD}$ of the cladding. The height dimension h, and the respective refractive indices are configured such that an increase in the index of refraction of the polymer to the coupled index value $n_{EO}'$ causes a relatively high intensity portion of an optical signal propagating along the waveguide core to couple into the electrooptic polymer, propagate along the electrooptic polymer, and subsequently return to the waveguide core.

Accordingly, it is an object of the present invention to provide schemes for controlling an optical signal propagating along a waveguide structure through suitable design and manipulation of an optically functional polymer region incorporated in the waveguide structure. Other objects of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which:

FIG. 6 is a schematic representation of a ridge waveguide structure according to the present invention employing tapered transition regions;

FIGS. 6A–6C are graphical representations of respective transverse field profiles of an optical signal propagating at different points along the ridge waveguide structure of FIG. 6;

FIG. 11 is a schematic representation of an optical writing device incorporating a waveguide structure according to the present invention; and FIG. 12 is a schematic representation of a Mach-Zehnder interferometer incorporating a waveguide structure according to the present invention.

DETAILED DESCRIPTION

Figure 1:
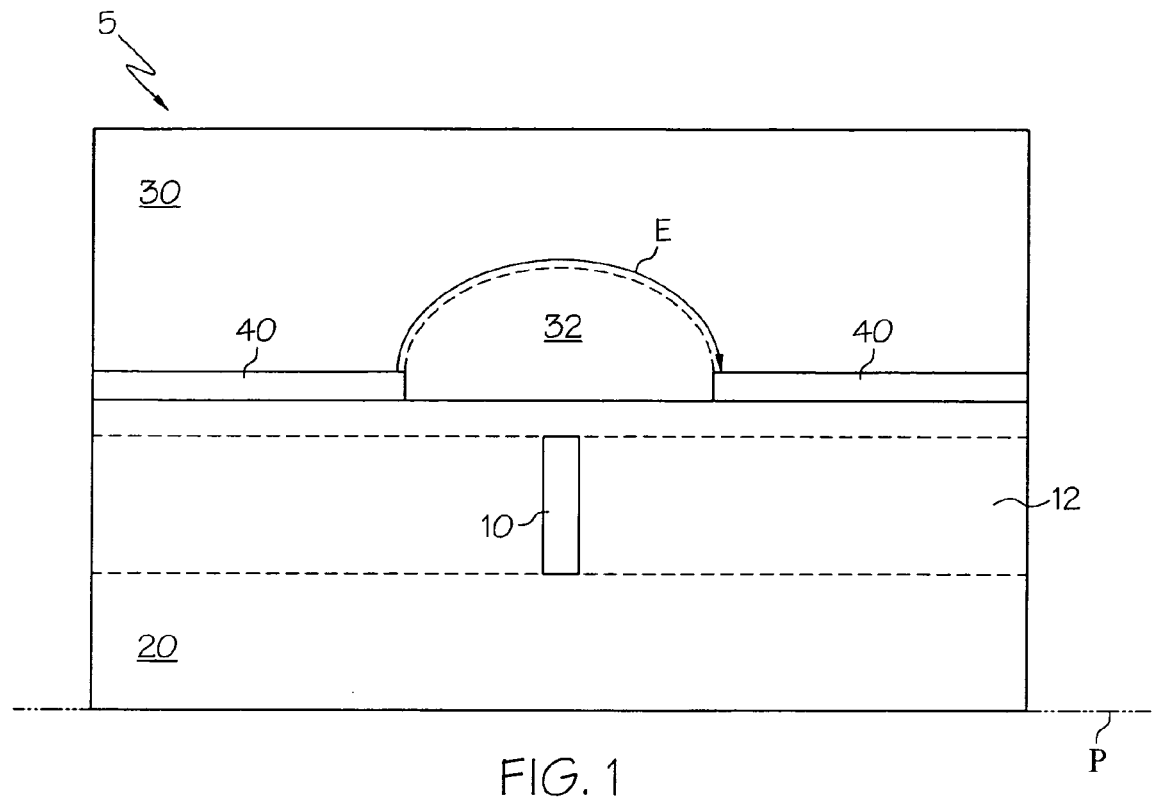
FIG. 1 is a schematic representation of a waveguide structure according to one embodiment of the present invention.

A scheme for attenuating or otherwise controlling an optical signal propagating along a waveguide in a planar lightwave circuit 5 can initially be illustrated with reference to FIG. 1, where a planar lightwave circuit 5 is illustrated comprising a waveguide core 10, a cladding 20, an electrooptic polymer 30, and a set of control electrodes 40. The electrooptic polymer 30 extends along a portion of the waveguide core 10 in the direction of optical propagation defined by the core 10 and is spaced from the core 10 by a portion of the cladding 20.

The electrooptic polymer 30 is configured to define an index of refraction that varies under application of a suitable electric field generated by the control electrodes 40. Although it is contemplated that the polymer 30 may comprise a poled or un-poled electrooptic polymer dominated by the Pockels Effect, the Kerr Effect, or some other electrooptic effect, according to one embodiment of the present invention, the polymer 30 is selected such that the variation of the index of refraction is dominated by an electrooptic response resulting from the Kerr Effect. It is contemplated that Kerr Effect mediums are more likely to have the capacity for significantly higher changes in index of refraction than mediums dominated by the Pockels Effect.

For the purposes of defining and describing the present invention, in an un-poled polymer medium there is no permanent or relatively permanent bulk ordering of the material prior to application of the electric field described above. Application of the electric field induces a birefringent state, while removal of the applied field leads to relatively rapid relaxation of the material to its original state. A Kerr Effect medium is an un-poled medium that is characterized by a dominant electrooptic response where the application of an electric field at a frequency below the characteristic relaxation frequency of the material produces a birefringence in a propagating optical signal that varies with a square of the magnitude of the applied field. More specifically, the function approximated by the refractive index of a Kerr Effect medium of the present invention may take the form of the following equation:

$$\Delta n = \lambda K E^2$$

wherein $\Delta n$ represents a change in refractive index, $\lambda$ represents the wavelength of light propagating in the Kerr Effect, K represents the Kerr constant of the Kerr Effect medium and E would represent the magnitude of the electric field applied to the medium. In a standard Kerr material, the refractive index increases along the direction of the applied field and decreases in both orthogonal directions. However, there are Kerr materials in which the refractive index decreases in the direction of the applied field and increases in the other two directions.

Kerr Effect mediums according to the present invention should be able to transition passively from a substantially oriented state towards a substantially isotropic state, particularly where their use in an optically functional region involves active transition to a substantially oriented state. As a result, the present invention contemplates Kerr Effect mediums comprising a polymer/chromophore blend characterized by a degree of chromophore mobility sufficient to enable the optically functional region to transition passively from a substantially oriented state to a substantially isotropic state, typically in less than about one second, and more preferably in less than one millisecond. In addition, where an un-poled, polymeric medium is utilized, the degree of chromophore mobility should also be sufficient to permit transitions from a substantially isotropic state to a substantially oriented state under application of a suitable control signal, particularly where their use in an optically functional region involves active transitions to and from a substantially oriented state.

As is noted in Published U.S. Patent Application No. 2004/0184694 A1, the disclosure of which is incorporated herein by reference, a Kerr device can respond to combined low frequency and high frequency electric fields. In this case, the low frequency (DC) electric field orients the chromophores while the oriented chromophores respond to the high frequency field in a manner analogous to the Pockels effect. However, in the Kerr context, removal of the DC electric field leads to a rapid diminishment of the response of the material to the high frequency field. Under a DC driving scheme, the control voltage is applied in such a way that the device performance is maintained at an effectively constant level over time periods much longer than the characteristic orientation time of the Kerr material. This operation scheme mandates effectively constant orientation and birefringence over the time span of the control signal. In contrast, poled materials behave similarly under DC voltage as under higher frequency voltages because the orientational order is not altered by the application of the control voltage.

A poled material is one where the material is ordered prior to use and the degree of order remains effectively constant during and substantially after application of the control voltage. The response of the poled material is linear with the applied electric field (Pockels Effect) and is frequency independent from DC to >10 GHz. In the context of poled electrooptic polymers, it may also be advantageous to apply a control signal bias to the polymer to prevent degradation of the orientation over the operational lifetime of the device. One may distinguish between a poled material with applied bias and a Kerr material by the timescale over which orientational relaxation occurs. A Kerr-based device uses the orientational relaxation from the more highly ordered state as part of the operational mechanism of the device, while the orientational relaxation of a poled device with bias occurs over time periods much longer than the expected duration of a given operational state of the device after removal of the applied bias.

The core 10, the cladding 20, and the electrooptic polymer 30 are configured such that a voltage-induced increase in the index of refraction of the polymer 30 causes a substantial portion of an optical signal propagating along the waveguide core 10 to couple into a relatively high index region 32 of the electrooptic polymer 30. Further, the core 10, the cladding 20, and the electrooptic polymer 30 can be configured such that the coupled portion of the optical signal is either lost in the polymer 30 or is directed away from the core 10 and, as such, does not return to the waveguide core 10.

Figure 2:
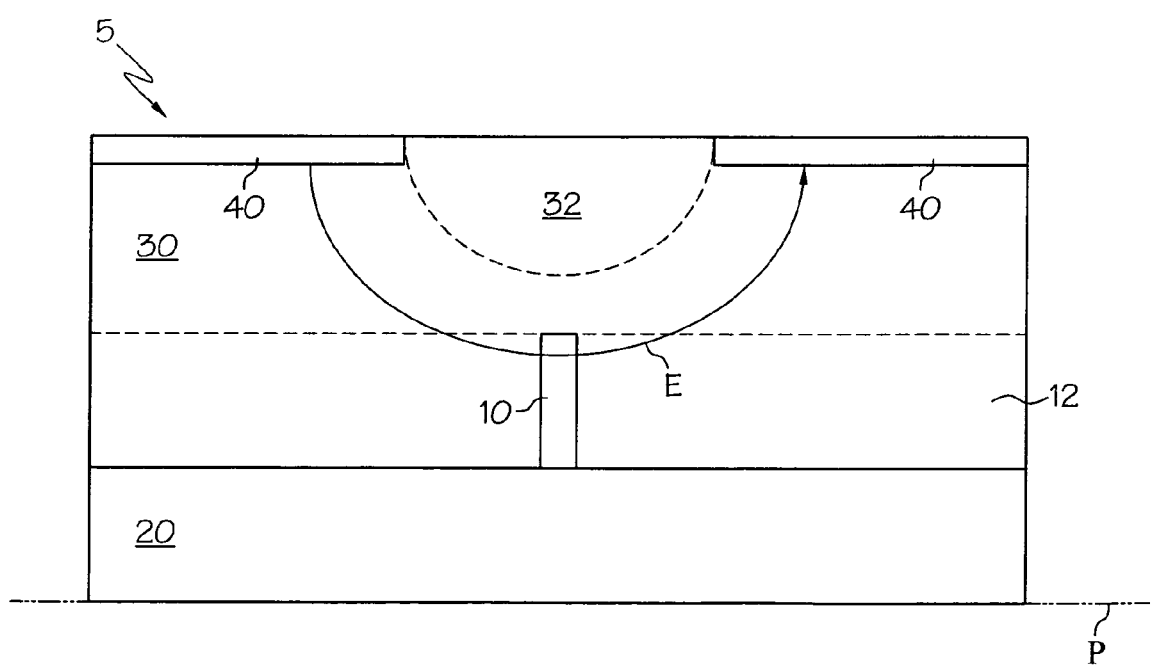
FIGS. 2 and 3 are schematic representations of a waveguide structure according to another embodiment of the present invention, incorporating two different electric field induced high index regions therein.

As is illustrated in FIGS. 1 and 2, the waveguide core 10 defines a core thickness occupying a corresponding core layer 12 of the planar lightwave circuit 5. The core layer 12 extends generally parallel to the lightwave circuit plane P defined by the planar lightwave circuit 5. The electrooptic polymer 30 and the set of control electrodes 40 are configured to define the high index region 32 substantially above the core layer 12. In this manner, the active area defined by the waveguide core 10, the electrooptic polymer 30, and the set of control electrodes 40 defines a structure that complements the general orientation of additional optical components, e.g., arrayed waveguide gratings, optical splitters, optical amplifiers, etc., that are typically configured in the planar lightwave circuit 5. Additionally, the core/polymer/electrode configuration of the present invention can be formed in the planar lightwave circuit 5 with minimal disruption to the circuit 5 and its various components. Further, where the structure of the present invention is to be configured to create a network of variable optical attenuators in the planar lightwave circuit 5, the concept of the present invention makes such a configuration realizable on a dense integrated optical system. An example of such an optical system is illustrated in FIG. 11, discussed in detail below. For example, and not by way of limitation, it is contemplated that up to 64, or more, variable optical attenuators can be spaced within the planar lightwave circuit at a pitch of between about 50 μm and about 250 μm.

For clarity of illustration, it is noted that the direction of propagation along the waveguide core 10 runs generally orthogonal to printed face of the views presented in FIGS. 1 and 2. It is contemplated that, under certain circumstances, the extent of the active region defined by the electrooptic polymer 30 and the control electrodes 40 along the direction of propagation of the optical signal in the core 10 may need to be limited to a given dimension to prevent uncontrolled or premature coupling of all or part of the coupled optical signal back into the waveguide core 10 from the high index polymer region 30. It is further contemplated that a series of segmented active regions may be presented in the planar lightwave circuit 5 in the event that the optical path presented by the limited dimension of a single active region is insufficient to achieve the desired amount of signal attenuation in operating the device of the present invention. Each of the aforementioned active region segments could be similarly defined by corresponding control electrodes 40 and electrooptic polymer regions 30 of suitable length. It is contemplated that suitable optical path lengths of active region segments according to the present invention can be as long as about 0.25 mm to about 1.0 mm. For example, a total active length of about 4 mm, yielding a loss in excess of 20 dB would be suitable for many applications. In addition, the aforementioned active region segments may be configured so as to alter a selected polarization mode of the optical signal. For example, segments configured to alter the TE polarization mode of the optical signal can be alternated with segments configured to alter the TM polarization mode of the optical signal.

In operation, the variable optical attenuator structure is maintained at a temperature at which chromophores of the un-poled electrooptic polymer 30 are mobile. Further, a suitable electric field E is generated in the electrooptic polymer 30 by applying a suitable DC driving voltage to the control electrodes 40. The resulting electric field E created in the polymer 30 orients a substantial portion of the chromophores in the polymer, increasing the index of refraction of a portion of the polymer to generate the high index region 32 in the polymer. The resulting increase in the index of refraction of the polymer 30 causes a substantial portion of the optical signal propagating along the waveguide core 10 to couple into the relatively high index region 32 of the electrooptic polymer 30, where the coupled signal is lost from the system. It is contemplated that this increase in index of refraction may only be valid in the context of particular Kerr materials and for TE polarized light or light of other particular polarizations.

If the DC driving voltage is varied at the operating temperature of the structure, the degree to which the optical signal couples into the polymer is also varied. This corresponding variance in coupling can be used to control attenuation of the optical signal in the waveguide core 10 because the structure can be configured so that the coupled signal is lost from the core 10. For its part, the cladding comprises a material that is relatively non-responsive to the electric field.

It is contemplated that the DC driving voltage can be varied between a maximum value that is sufficient to create the high index region 32 of the polymer 30 and a minimum value where the electrooptic polymer tends towards a less oriented state. By way of illustration, and not limitation, it is noted that in the case of many suitable Kerr Effect polymers, driving voltages less than about 500V DC may cause insubstantial coupling of the optical signal into the electrooptic polymer 30 while driving voltages above about 500V DC can lead to substantial coupling. Further, it is noted that for many Kerr Effect polymers driving voltages of between about 1000V DC and about 1500V DC can lead to substantially complete coupling of the optical signal into the electrooptic polymer 30. It is noted that driving voltages will, in many instances, vary significantly from these stated values because they are dependent upon the specific polymer material utilized in accordance with the present invention. Indeed it is contemplated that operational voltages could be as low as a few volts, given the right materials and operating conditions.

The electric field is generated such that a major portion of the high index region 32 is spaced well above the waveguide core—typically further from the waveguide core 10 than are the control electrodes 40. For example, although the representation of the high index region 32 in FIG. 1 is not intended to present a precise illustration of its location and bounds, it is noted that the electric field may be generated such that a central portion of the relatively high index polymer region 32 is displaced from a central portion of the waveguide core 10 by between about 5 μm and about 10 μm. To this end, the un-poled electrooptic polymer 30 can be spaced from the cladding 20 by between about 1 μm and about 5 μm.

The temperature of the optical structure of the present invention should be maintained above a threshold at which the un-poled electrooptic polymer 30 exhibits a degree of chromophore mobility that is sufficient to permit the applied electric field to induce a birefringence sufficiently large to allow for useful operation of the device. For example, and not by way of limitation, the un-poled electrooptic polymer can be configured to exhibit sufficient chromophore mobility at less than between about 70° C. and about 100° C. Although the concepts of the present invention may be employed at variety of operating temperatures, it is noted that this temperature range can be particularly advantageous where the intent is to couple the optical structure to an input or output of an arrayed waveguide grating, as arrayed waveguide gratings often operate at substantially the same temperature.

Suitable Kerr Effect mediums for use in the present invention typically comprise a polymer/chromophore blend or a polymer with the chromophore attached as a side chain. The polymer/chromophore blend may, for example, comprise between about 5% and about 20% chromophore, by weight, although other suitable weight % ranges are likely to also be suitable. By way of illustration and not by limitation, it is noted that the polymer may comprise a fluoropolymer or a polymer selected from polycarbonate, PMMA, and polycyclohexane. In the event a solvent is used to enhance chromophore mobility, suitable solvents include, but are not limited to dioxane, THS, and chloroform. In addition, the Kerr effect medium may comprise a chromophore in a crosslinked polymer or sol-gel matrix, as long as the component that possesses the large optical anisotropy has sufficient mobility to reorient under the influence of an applied electric field. The Kerr effect medium may also comprise liquid crystal molecules embedded in the host polymer, or other material where birefringence can be induced by an applied electric field.

It is noted that chromophores suitable for use in the present invention will typically comprise molecules that possess optical anisotropy (birefringence) and a dipole moment and that are capable of changing orientation in the presence of an applied electric field. For example, by way of illustration and not limitation, a class of suitable chromophores for use in the present invention comprises a donor component, a bridge component comprising a conjugated and/or aromatic component, and an acceptor component. The donor component may comprise a relatively strong electron-donating group and the acceptor component may comprise a relatively strong electron accepting group. For the purposes of describing and defining the present invention, it is noted that a donor component comprises a component that is capable of donating electrons, an acceptor component comprises a component that is capable of accepting electrons, and a bridge component couples donor and acceptor components strongly. Preferred chromophores may also be selected by accounting for the degree to which they absorb light at the frequency of the propagating signal, with low levels of absorption preferred.

By way of illustration and not limitation, chromophores having the molecular structures described in U.S. P.G. Pub. No. U.S. 2004-0184694 A1, the disclosure of which is incorporated herein by reference, may be suitable for use in accordance with the present invention.

It is contemplated that un-poled electrooptic polymer polymeric mediums according to the present invention may be provided with acceptable degrees of chromophore mobility and physical stability by either incorporating a plasticizing agent in the medium or ensuring that the operating temperature of the device approaches the glass transition temperature of the medium. For example, it is contemplated that un-poled polymeric mediums characterized by effective glass transition temperatures $T_g$ below about 120° C. and even as low as 20° C. or below would be particularly advantageous as they would eliminate many design constraints associated with maintaining a waveguide device at high temperatures. Polymeric mediums exhibiting chromophore mobility at operating temperatures between about 70° C. and about 100° C. would also be particularly advantageous because these temperatures are compatible with typical operating temperatures of arrayed waveguide gratings and other similar optical components.

It is also contemplated that un-poled electrooptic polymers according to the present invention may be provided with an acceptable degree of chromophore mobility by providing a suitable solvent in the medium. In the case of a polymeric medium including a chromophore and a base polymer, suitable solvents will dissolve both the chromophore and the polymer. In many cases, the use of such solvents will yield suitable device operating temperatures at or near room temperature. For the purposes of defining and describing the present invention, it is noted that reference herein to acceptable degrees of chromophore mobility are made with the implicit assumption that the material will exhibit such mobility within at least a portion of the operational temperature range of the device at issue, unless otherwise noted.

Figure 3:
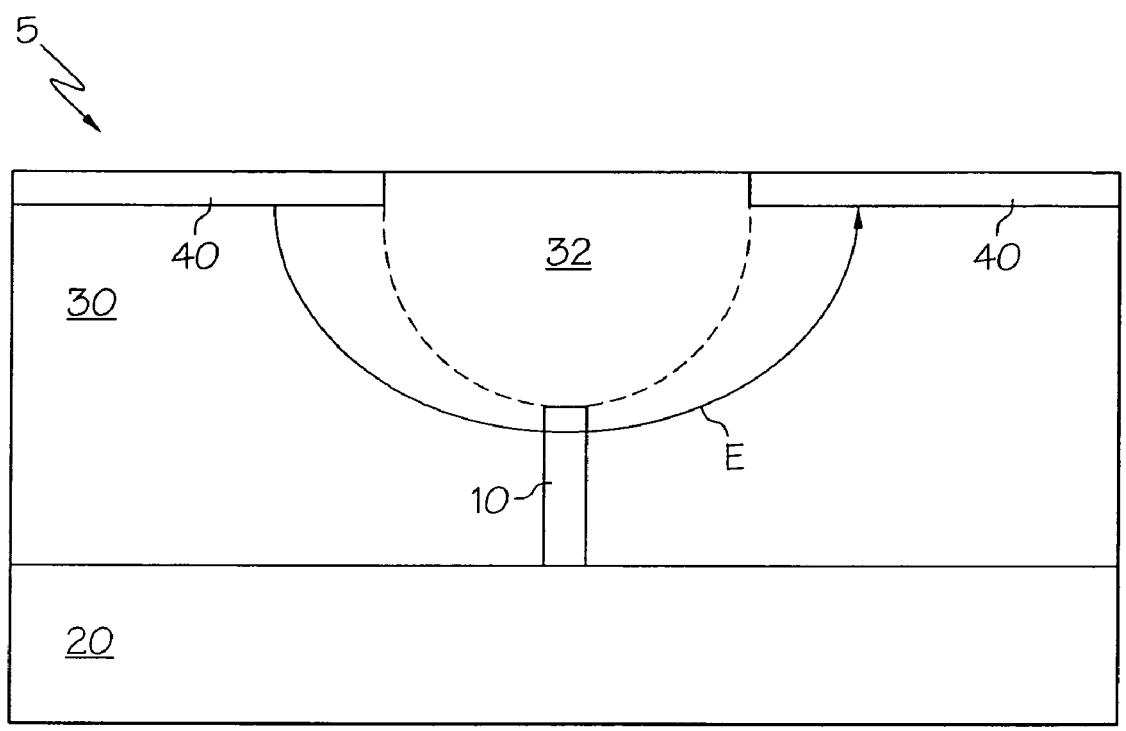

Referring to the embodiments of the present invention illustrated in FIGS. 2 and 3, it is noted that the un-poled electrooptic polymer 30 may be configured to surround a substantial portion of the waveguide core 10, as opposed to being spaced from the waveguide core 10, as is the case in the embodiment of FIG. 1. In the embodiment of FIG. 2, the electric field is generated such that a majority of the relatively high index polymer region 32 is defined in a substantially triangular region defined by the control electrodes 40 and the waveguide core 10. By way of example, and not limitation, the electric field can be generated such that a central portion of the relatively high index polymer region 32 is displaced from a central portion of the waveguide core 10 by between about 5 μm and about 10 μm.

In the embodiment of FIG. 3, the strength of the electric field is increased and the central portion of the relatively high index polymer region 32 is driven closer to the core 10—essentially destroying the core 10 as a single-mode waveguide. In this embodiment, the refractive index of the high index polymer region 32 would approach, reach, or exceed that of the core 10 and the signal propagating in the core 10 would be lost from the system.

In embodiments of the present invention where the optical signal that couples into the polymer 30 is dispersed and does not re-enter the waveguide core 10, it is contemplated that it may be advantageous to employ an electrooptic polymer that exhibits relatively large intrinsic losses. It may also be advantageous to employ an electrooptic medium that exhibits an increased loss rate with increasing refractive index. In this manner, as the optical signal is increasingly withdrawn from the waveguide core 10, it is more efficiently removed from the system. For example, and not by way of limitation, a well-known example of such a material are polymer-dispersed liquid crystals, where application of an electric field orients the liquid crystal droplets, increasing the effective refractive index along the direction of the applied field and leading to increased light scattering for light polarized along the direction of the applied electric field.

In the context of guiding non-polarized light, i.e., optical signals including both a horizontally oriented component TE and a vertically oriented component TM, the positioning of the waveguide core 10 within the contoured electric E generated by the DC driving voltage alters the relative efficiency of the electrooptic interaction with the two dominant polarizations of the propagating optical signal. In some configurations, the TE polarization is altered more than the TM polarization. In other orientations, the opposite is true.

Figure 9A:
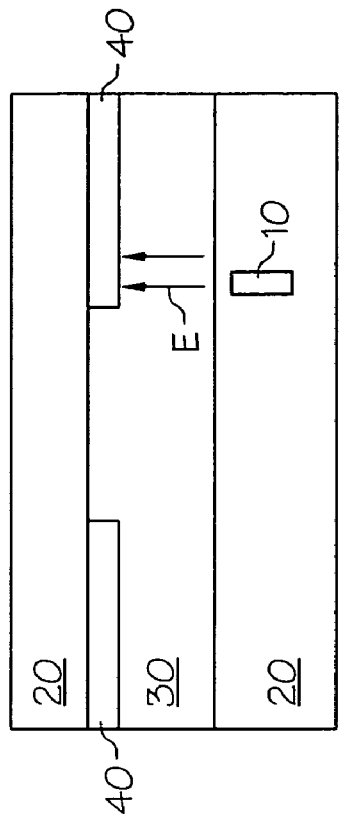
FIGS. 9A–9C are schematic representations of particular waveguide structures configured to provide for electrooptic responses that are predominately sensitive to TM polarized light.
Figure 9B:
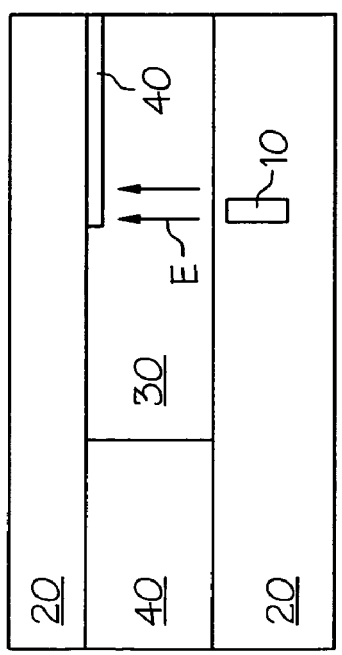
Figure 9C:
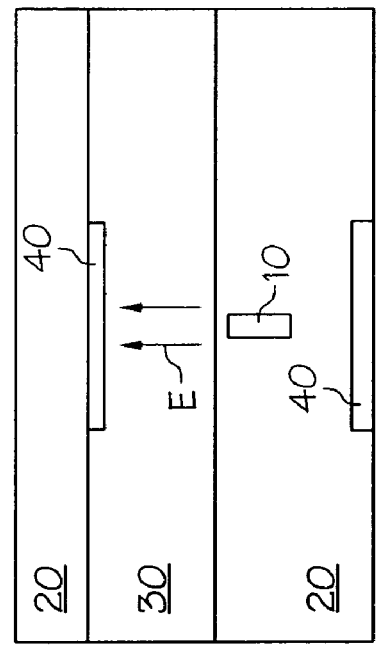
Figure 10A:
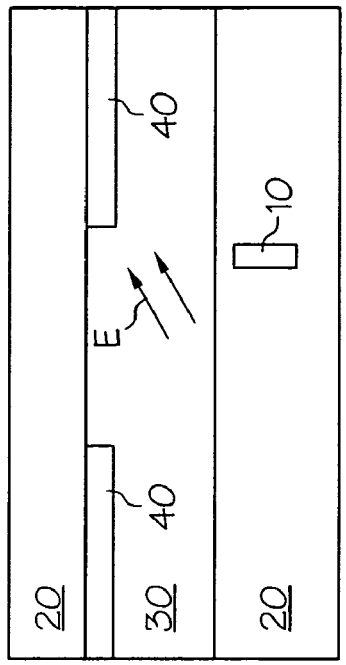
FIGS. 10A–10C are schematic representations of particular waveguide structures configured to provide for electrooptic responses that provide for electrooptic responses that are substantially insensitive to the polarization of the optical signal.
Figure 10B:
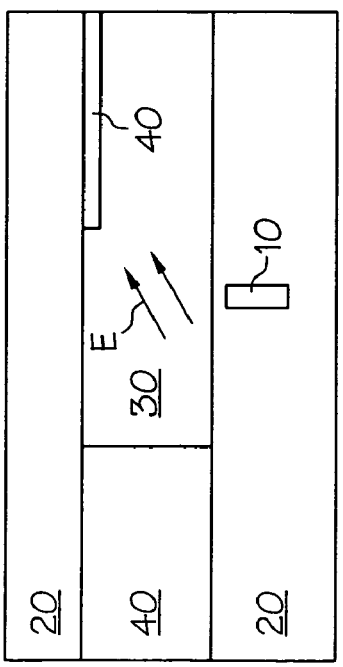
Figure 10C:
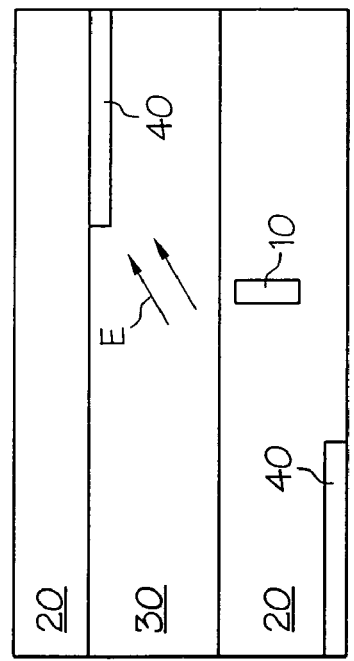

Referring to FIGS. 8–10, it is noted that the control electrodes 40 can be configured relative to the waveguide core 10 to provide an electrooptic effect that is either polarization independent (FIGS. 10A–10C), or will predominately alter TE polarized light (FIGS. 8A–8E) or TM polarized light (FIGS. 9A–9C). More specifically, the electrode/core configurations illustrated in FIGS. 8A–8E are examples that will provide for electrooptic responses that are predominately sensitive to TE polarized light. To a lesser extent (about ⅓) the electric fields E illustrated schematically in FIGS. 8A–8E will also affect the TM polarized light. Similarly, the electrode/core configurations illustrated in FIGS. 9A–9C are examples that will provide for electrooptic responses that are predominately sensitive to TM polarized light. To a lesser extent (about ⅓) the electric fields E illustrated schematically in FIGS. 9A–9C will also affect the TE polarized light. The relation between the effect on TE and TM polarized light is typically different for Kerr mediums. For example, if the index increases for TE, the TM index will decrease by about ½ the amount, assuming the fields are uniform. In many of the electrode configurations illustrated herein, the TM mode will see little change due to the curvature of the electric field.

Referring to the embodiment of FIG. 9C and any other embodiments where an electrode 40 or other conductive member is to be positioned below the waveguide core 10, it is contemplated that a region of relatively high conductivity silicon may be formed in or below the cladding 20 and may be utilized as an equivalent to the electrode 40 illustrated below the core 10 in FIG. 9C.

The electrode/core configurations illustrated in FIGS. 10A–10C are examples that will provide for electrooptic responses that are substantially insensitive to the polarization of the optical signal. It is noted, however, that the electrode patterns in FIG. 10 will provide substantially the same response for the TE and TM modes, which is not necessarily the same as polarization insensitivity.

For the purposes of describing and defining the present invention, it is noted that TE and TM polarized light represent two independent electromagnetic modes of an optical signal. The electromagnetic field distribution is referred to as the transverse electric (TE) mode where the electric field of the optical signal is perpendicular to the plane extending along the primary axis of propagation of the waveguide core. The electromagnetic field distribution is referred to as the transverse magnetic (TM) mode where the magnetic field of the optical signal is perpendicular to the plane extending along the primary axis of propagation of the waveguide core. It is also noted that in a channel waveguide of the illustrated type, the propagating modes are not purely TE or TM polarized. Rather, the modes are typically more predominantly one or the other and are commonly so designated. Accordingly, a TE polarized mode may merely comprise a distribution where the electric field component parallel to the plane of propagation is the largest component of the signal. Similarly, a TM polarized mode may merely comprise a distribution where the magnetic field component parallel to the plane of propagation is the largest component of the signal.

Referring specifically to FIG. 11, it is noted that an optical writing device 70 or other type of optical signal output device may be formed as an assembly including a plurality of variable optical attenuator structures 75 configured in any of the variety of respective manners described herein. Specifically, in the illustrated embodiment, the writing device, which may for example be configured as a DVD writing unit characterized by an optical signal pitch on the order of about 50 μm, can be configured for independent control of respective DC driving voltages of the plurality of variable optical attenuator structures indicated generally at 75. To this end an array of control electrodes 40 and optical waveguide cores 10 are also illustrated in FIG. 11. Further, light from a single optical source 72 is directed to the respective attenuator structures via the network of waveguide cores 10. Each of the attenuators within the plurality of optical attenuator structures 75 is configured direct an optical signal attenuated therein to separate outputs 74 of the optical writing device 70.

Although the above-noted embodiments of the present invention are described in the context of a variable optical attenuator structure, it is also contemplated that the concepts of the present invention may be applied to schemes for controlling the phase of an optical signal. Specifically, waveguide structures according to the present invention may be configured to drive the coupling of the optical signal into the high index region 32 of the un-poled electrooptic polymer 30 and to permit the return of the signal to the waveguide core 10. The conditions of the propagation of the signal in the high index region 32 could then be tailored to impart a particular phase delay into the optical signal upon its return to the core 10. For example, referring to FIG. 12, it is contemplated that such phase delay structures, represented generally at 85, could be incorporated into one or both arms 82, 84 of a Mach-Zehnder interferometer configuration 80. The details by which the respective phases of the optical signals traveling along each waveguide arm can be varied to create a variation in the optical signal output from the interferometer structure are beyond the scope of the present invention and may be readily gleaned from literature describing Mach-Zehnder interferometers and other related devices.

Figure 5:
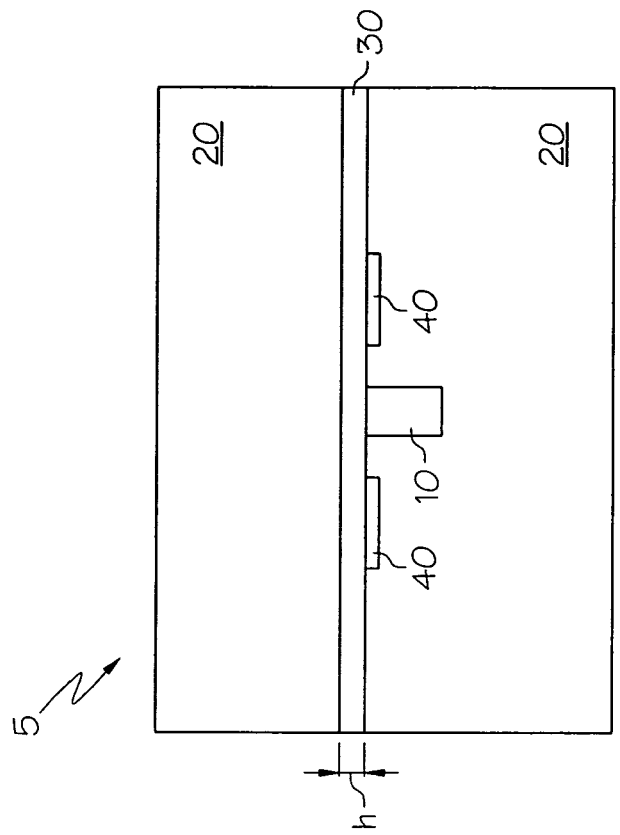
FIG. 5 is a schematic representation of a ridge waveguide structure according to the present invention employing on-chip electrodes.
Figure 4:
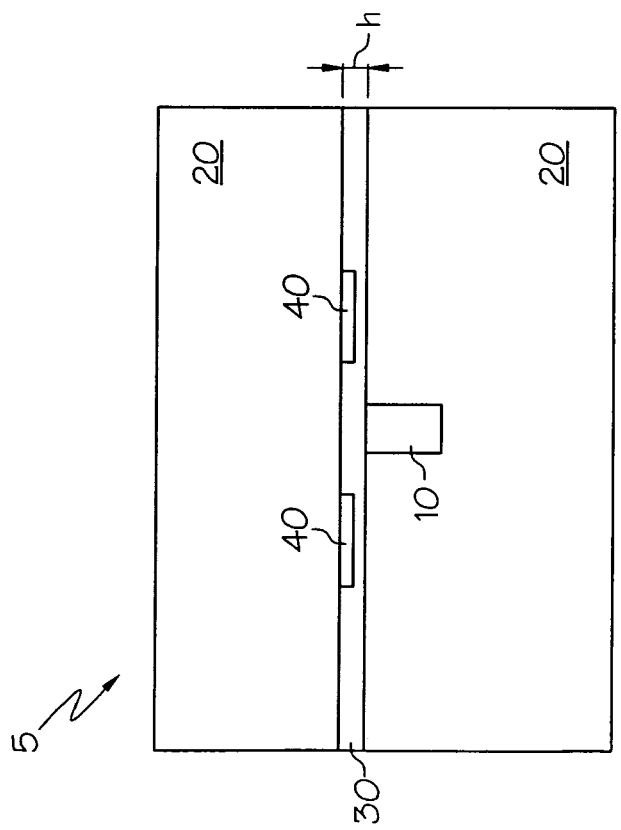
FIG. 4 is a schematic representation of a ridge waveguide structure according to the present invention employing cover plate electrodes.

Referring to the "ridge" waveguide structure of FIGS. 4 and 5, the present invention also contemplates a scheme for controlling an optical signal propagating along a waveguide where the electrooptic polymer 30 defines a limited height dimension h and is bound on opposite ends of the height dimension h by the waveguide core 10 and the cladding 20. According to one embodiment of the present invention, the electrooptic polymer 30 is applied above a waveguide structure and the mode shape of a signal propagating along the waveguide core 10 is encouraged to expand and couple vertically into the electrooptic polymer 30. As the signal propagates along the waveguide structure in the coupled state, the configuration of the device is such that the signal couples back into the waveguide core 10. Further reference to this type of propagation is made below with reference to FIGS. 6A–6C.

The electrooptic polymer 30 is configured to define an index of refraction that varies from an un-coupled value $n_{EO}$ to a coupled value $n_{EO}'$ under application of a suitable electric field generated by the control electrodes 40. The un-coupled index value $n_{EO}$ is typically less than the refractive index $n_{CORE}$ of the waveguide core 10, although the un-coupled index value $n_{EO}$ can be greater than the refractive index $n_{CORE}$ as long as single mode propagation is maintained. The coupled index value $n_{EO}'$ is greater than the un-coupled refractive index value $n_{EO}$ and the index of refraction $n_{CLAD}$ of the cladding. Accordingly, the height dimension h can be selected such that a voltage-induced increase in the index of refraction of the polymer to the coupled index value $n_{EO}'$ causes a high intensity portion of an optical signal propagating along the waveguide core 10 to couple into the electrooptic polymer 30. The signal subsequently propagates along the electrooptic polymer 30, bounded at one extreme by the cladding 20, and returns to the waveguide core 10. The shift of the high intensity portion of the propagating signal to and from the polymer 30 is illustrated in more detail in FIGS. 6A–6C, discussed below.

It is noted that the ridge waveguide structure illustrated in FIGS. 4 and 5 and elsewhere in the present description may employ poled electrooptic polymers where the molecular orientation is substantially fixed in an oriented state (typically by poling the polymer in a heated state and subsequently cooling the polymer) or un-poled electrooptic polymers where the molecular orientation is fixed during operation, under the influence of an applied electric field. It is noted that, in the context of poled materials, a DC voltage or other control signal may be utilized to enhance the orientational stability of the poled material.

Referring to FIG. 6, it is noted that successful coupling and return of the optical signal to the waveguide core 10 is, to some extent, dependent upon the length l of an active region 50 defined by the control electrodes 40 and the un-poled electrooptic polymer 30. As is illustrated in FIG. 6, the length l of the active region 50 extending along a portion of the waveguide core 10. By way of illustration, and not limitation, it is contemplated that the active region 50 should, in some embodiments of the present invention, extend for at least about 0.5 cm and less than about 4 cm. FIGS. 6A–6C present respective transverse field intensity profiles of the optical signal before entry into the active region 50 (see FIG. 6A), coupled into the un-poled electrooptic polymer 30 within the active region 50 (see FIG. 6B), and following return to the waveguide core 10 upon exit from the active region 50 (see FIG. 6C). A 3 μm vertical shift of the central, high intensity portion of the signal from the 0,0 coordinate of FIG. 6A is illustrated in FIG. 6B and represents the above-described coupling of the optical signal to the un-poled electrooptic polymer 30.

To promote the return of the coupled optical signal to the waveguide core 10, the control electrodes 40, the height dimension h, and the respective refractive indices of the waveguide core 10, the cladding 20, and the electrooptic polymer 30 should be configured such that the coupled optical signal is constrained to single-mode propagation in the waveguide core 10 and the high index region of the polymer 30. Those practicing the present invention should appreciate that a variety of suitable combinations of specific values for these parameters will yield single mode propagation in the core 10 and polymer. However, by way of illustration, and not limitation, it is noted that the height dimension h may be selected to fall between about 1 μm and about 4 μm. Alternatively, it is contemplated that the waveguide structure of the present embodiment may be configured such that a combination of the height dimension h and a corresponding height dimension of the core falls between about 3 μm and about 12 μm.

It is also contemplated that the height of the core within the active region may be reduced relative to its height outside of the active region 50, yielding a partial core within the active region 50. In this case, the height dimension h of the un-poled electrooptic polymer 30 is selected to compensate for the reduced height of the core, hereafter referred to as the reduced core height $h_C$, so that the electrooptic polymer layer forms as an integral part of the waveguide structure, allowing light to couple into and out of the structure including the reduced height core 10 and the polymer 30. It is contemplated that signal loss can be minimized by keeping the center of the mode in the active region 50 aligned with the center of the mode in the active region 50 as the optical signal enters and exits the active region 50. For example, it may be preferable to reduce the height of the core 10 in the active region 50 by about 2 μm and compensate for the reduced height by providing a un-poled electrooptic polymer layer 30 of about 2 μm. It is anticipated that such a configuration may in many instances yield a more effective active region 50 because the propagating optical signal is to a certain extent encouraged to propagate in the polymer 30, particularly where the DC driving voltage is applied to the polymer.

In the context of a reduced core height, it may be preferable to reduce the width of the waveguide core to maintain single mode propagation, particularly if the polymer 30 has an index significantly higher than the core index. It is noted that the tapered waveguide portions discussed below with reference to FIG. 6 represents an alternative means for maintaining single mode propagation.

To further illustrate the partial core configuration discussed above, it is noted as a further example that it may be sufficient to select the reduced core height $h_C$ and the height dimension h to be approximately equal to the corresponding height dimension of the core 10 outside of the active region 50 within a particular range, e.g., about +/−2 μm or less. It is contemplated that reduced core heights $h_C$ between about 1 μm and about 5 μm less than the corresponding height dimension of the core outside of the active region will, in many instances be compatible with conventional and yet to be developed waveguide structures.

Also illustrated in FIG. 6 are respective signal transition regions 60 defined in the vicinity of the input portion and output portion of the active region 50. In the illustrated embodiment, the transition regions 60 define a tapered waveguide core of decreasing cross-sectional dimension in the vicinity of the input portion of the active region 50 and increasing cross-sectional dimension in the vicinity of the output portion of the active region 50. It is contemplated that the gradual tapered transitions 60 at the respective input and output of the active region 50 will minimize optical loss as the optical mode propagates into and out of the active region 50. It is further contemplated that the transition regions 60 may be configured to define a periodically segmented waveguide core in the vicinity of the input portion of the active region 50 and a periodically segmented waveguide core in the vicinity of the output portion of the active region 50. It is important to note that light propagating through the active region 50 in the ridge waveguide embodiments of the present invention never completely leaves the waveguide core 10.

Although not illustrated in FIGS. 4 and 5, it is contemplated that the control electrodes 40 need not be configured on opposite sides of the waveguide core 10. For example, according to an additional embodiment of the present invention, the control electrodes 40 can be configured in a parallel configuration above and below the core 10 illustrated in FIGS. 4 and 5. Additionally, it is contemplated that the electrodes 40 arranged in the parallel configuration described here could be substantially aligned with the core 10, above and below the core, or offset relative to each other and/or relative to the core 10. As is discussed above with respect to FIG. 9C, it is contemplated that a region of relatively high conductivity silicon may be formed in or below the cladding 20 and may be utilized as an equivalent to the electrode 40 below the core 10.

The specific composition of the core 10 is not a point of emphasis in many embodiments of the present invention and may, for example, be selected from materials comprising doped or undoped silica, doped or un-doped silicon, silicon-oxynitride, polymers, and combinations thereof. It is noted, however, that a silicon-oxynitride core may be most suitable in instances where the un-poled electrooptic polymer 30 is characterized by a relatively high refractive index, e.g., a refractive index approaching or exceeding 1.6.

As is discussed in detail above with respect to the embodiments of FIGS. 1 and 2, the un-poled electrooptic polymer 30 can be a Kerr Effect polymer, where the Kerr coefficient is a function of the properties of the un-poled electrooptic polymer including, but not limited to, the height dimension h. According to one aspect of the present invention, the height dimension h is selected such that Δn is accompanied by a waveguide efficiency in the polymer of at least about 40%, under application of the voltage-induced DC electric field. For the purposes of defining and describing the present invention, it is noted that this waveguide efficiency parameter is a measure of the amount of light that experiences the un-poled electrooptic polymer 30 in a propagating mode. For example, were the waveguide efficiency is about 40%, nearly half of the propagating optical mode experiences the polymer 30. It is contemplated that efficiency values of at least about 40% will yield substantial control of the optical signal by waveguide devices according to the present invention.

Figure 7B:
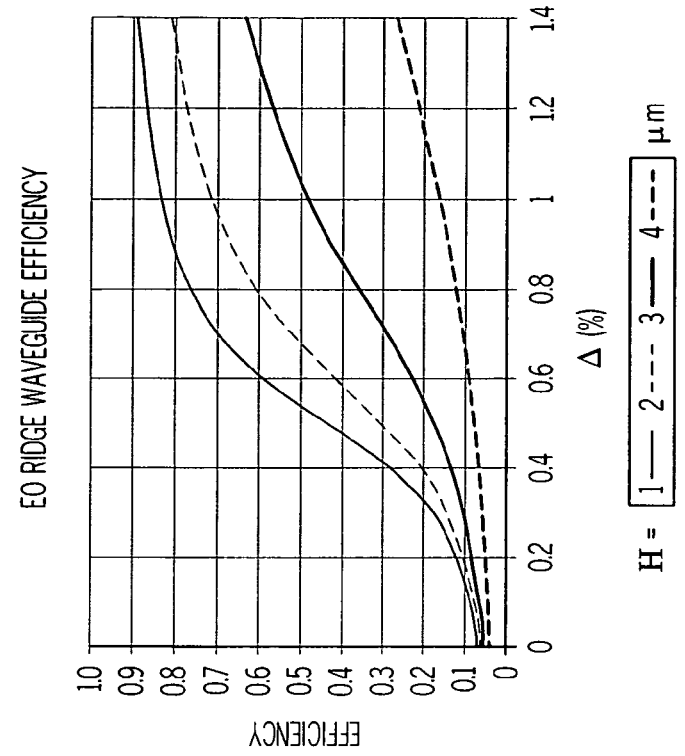
FIGS. 7A and 7B are graphical representations of optical signal loss and waveguide efficiency in particular ridge waveguide configurations according to the present invention.
Figure 7A:
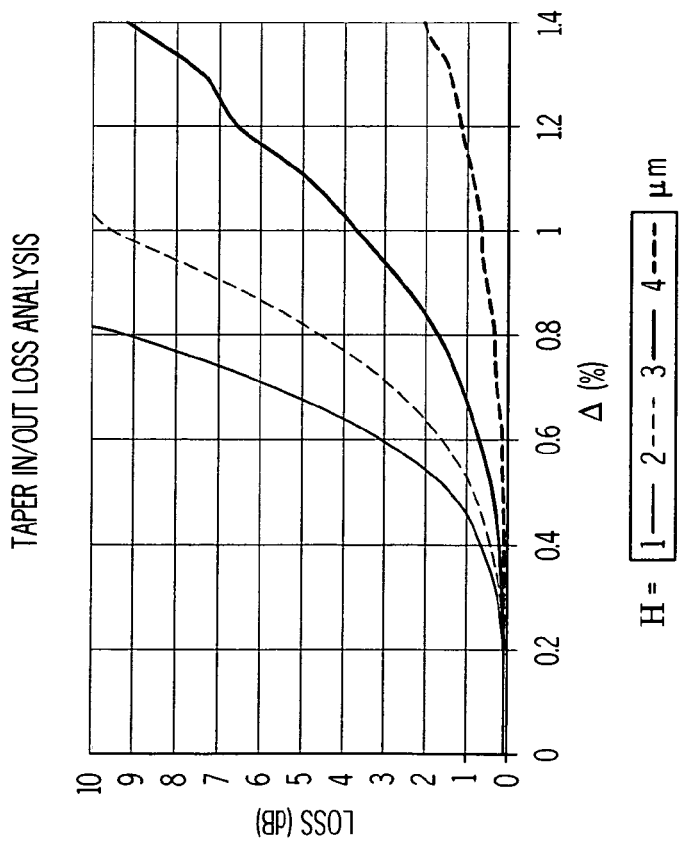
Figure 8A:
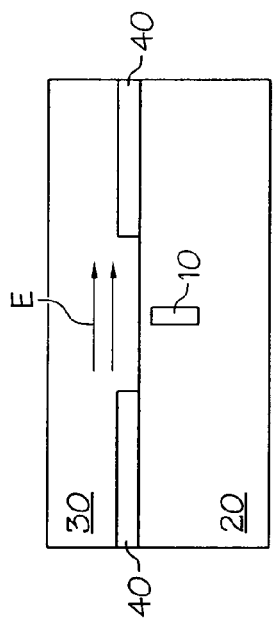
FIGS. 8A–8E are schematic representations of particular waveguide structures configured to provide for electrooptic responses that are predominately sensitive to TE polarized light.
Figure 8C:
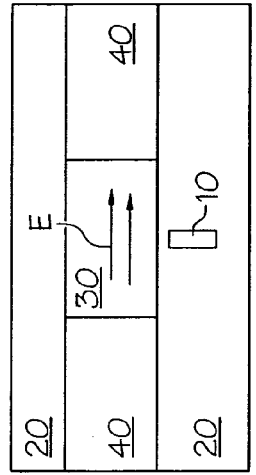
Figure 8E:
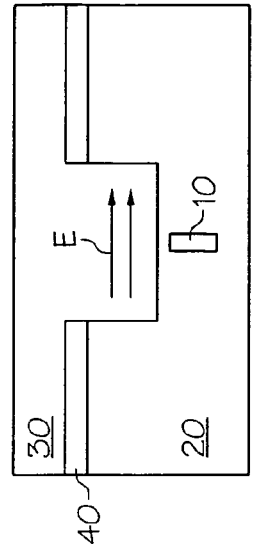
Figure 8B:
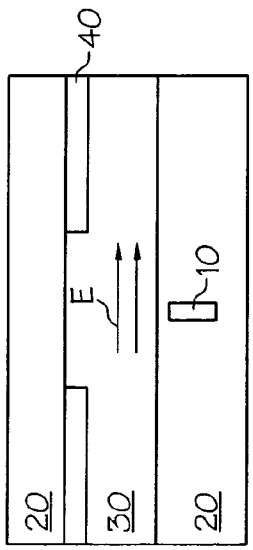
Figure 8D:
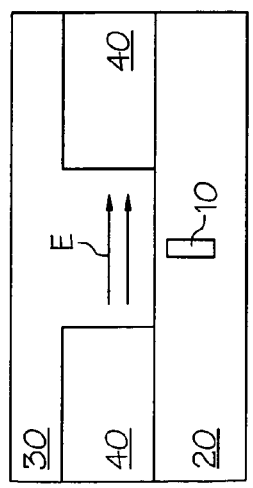

Turning to FIGS. 7A and 7B, it is noted that, given specific design parameters for Δn and the height dimension h, waveguide efficiency is inversely proportional to optical loss in the polymer 30. Accordingly, it is contemplated that a balance will need to be made in selection of acceptable degrees of optical loss and waveguide efficiency. For example, it is contemplated that the height dimension h will need to be selected such that a target Δn is accompanied by a substantial degree of signal loss, e.g., between about 1 dB and about 10 dB. Indeed, it is contemplated that many embodiments of the present invention will embody signal loss in the active region 50 that is above about 3 dB—a value that would, in many cases, be accompanied by waveguide efficiencies well above 40%, as is illustrated in FIGS. 7A and 7B. It is noted that these simulation results were taken for a full core height configuration and that better loss characteristics are contemplated for the above-described reduced core height configurations.

It is contemplated that the various waveguide structures and optical signal control schemes disclosed herein need not be limited to un-poled electrooptic polymers operating according to the Kerr Effect. Indeed, many of the requisite operational properties of the structures disclosed herein may be achieved through the use of thermo-optics, magneto-optics, electrooptics operating under the Kerr Effect or the Pockels effect, etc.

For the purposes of defining and describing the present invention, it is noted that the wavelength of "light" or an "optical signal" is not limited to any particular wavelength or portion of the electromagnetic spectrum. Rather, "light" and "optical signals," which terms are used interchangeably throughout the present specification and are not intended to cover distinct sets of subject matter, are defined herein to cover any wavelength of electromagnetic radiation capable of propagating in an optical waveguide. For example, light or optical signals in the visible and infrared portions of the electromagnetic spectrum are both capable of propagating in an optical waveguide. An optical waveguide may comprise any suitable signal propagating structure. Examples of optical waveguides include, but are not limited to, optical fibers, slab waveguides, and thin-films used, for example, in integrated optical circuits.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of controlling an optical signal propagating along a waveguide, said method comprising:
   providing a waveguide structure comprising a waveguide core, a cladding, an electrooptic polymer, and a set of control electrodes, wherein
   said eleotrooptic polymer defines a height dimension h substantially orthogonal to a direction of propagation of said optical signal,
   said electrooptic polymer is bound on opposite ends of said height dimension h by said waveguide core and said cladding,
   said electrooptic polymer is configured to define an index of refraction that varies from an un-coupled value $n_{EO}$ to a coupled value $n_{EO}'$ under application of a suitable electric field generated by said control electrodes,
   said coupled index value $n_{EO}'$ is greater than said un-coupled refractive index value $n_{EO}$ and an index of refraction $n_{CLAD}$ of said cladding, and
   said control electrodes, said height dimension h, and said respective refractive indices of said waveguide core, said cladding, and said electrooptic polymer are configured such that an increase in said index of refraction of said polymer to said coupled index value $n_{EO}'$ causes a relatively high intensity portion of an optical signal propagating along said waveguide core to couple into said electrooptic polymer, propagate along said electrooptic polymer, and subsequently return to said waveguide core;
   generating said electric field in said electrooptic polymer by applying a driving voltage to said control electrodes; and
   controlling said driving voltage such that said index of refraction of said electrooptic polymer reaches said coupled value $n_{EO}'$ in a relatively high index region of said electrooptic polymer and a relative high intensity portion of an optical signal propagating along said waveguide core couples into said high index region of said polymer, bounded at one extreme by said cladding, and subsequently returns to said waveguide core.

2. A method as claimed in claim 1 wherein said control electrodes, said height dimension h, and said respective refractive indices of said waveguide core, said cladding, and said electrooptic polymer are configured such tat said coupled optical signal is constrained to single-mode propagation in said waveguide care and said high index region of said polymer.

3. A method as claimed in claim 1 wherein:
   said electrooptic polymer comprises an un-poled electrooptic polymer; and
   said un-poled electrooptie polymer is selected such that said increase in said index of refraction of said polymer is dominated by an electrooptic response resulting from the Kerr Effect.

4. A method as claimed in claim 1 wherein said waveguide structure is configured such that a relative difference between said un-coupled index value $n_{EO}$ and said coupled index value $n_{EO}'$ is defined as follows:

$$\Delta n = \lambda_o K E^2$$

where $\lambda_o$ is the optical source wavelength, K is the Kerr coefficient of the electrooptic polymer, and E is the voltage-induced DC electric field.

5. A method as claimed in claim 4 wherein:
said Kerr coefficient is a function of properties of said electrooptic polymer including, but not limited to, said height dimension h;
said height dimension h is selected such that Δn is accompanied by a waveguide efficiency in said polymer of at least about 40% under application of said voltage-induced DC electric field.

6. A method as claimed in claim 4 wherein:
said Kerr coefficient is a function of properties of said electrooptic polymer including, but not limited to, said height dimension h;
said height dimension h is selected such that Δn is accompanied by a substantial degree of signal loss in said polymer under application of said voltage-induced DC electric field.

7. A method as claimed in claim 5 wherein said signal loss is between about 1 dB and about 10 dB.

8. A method as claimed in claim 4 wherein:
said Kerr coefficient is a function of properties of said electrooptic polymer including, but not limited to, said height dimension h, and a temperature of said electrooptic polymer; and
said method further comprises selecting said height dimension h and controlling the temperature of said waveguide structure suit that Δn is accompanied by a waveguide efficiency in said polymer of at least about 40% under application of said voltage-induced DC electric field.

9. A method as claimed in claim 1 wherein:
said set of control electrodes and said electrooptic polymer define an active region of said waveguide structure extending along a portion of said waveguide core in said direction of propagation of said optical signal; and
said waveguide core in said active region is characterized by a core height $h_C$ along a direction substantially parallel to said height dimension h, said core height being reduced relative to a corresponding height dimension of said core outside of said active region.

10. A method as claimed in claim 9 wherein a combination of said reduced core height $h_C$ and said height dimension h is approximately equal to said corresponding height dimension of said core outside of said active region, within a range of about +/−2 μm.

11. A method as claimed in claim 9 wherein said reduced core height $h_C$ is at least about 2 μm less than said corresponding height dimension of said core outside of said active region.

12. A method as claimed in claim 9 wherein said reduced core height $h_C$ is between about 1 μm and about 5 μm less than said corresponding height dimension of said core outside of said active region.

13. A method as claimed in claim 1 wherein said set of control electrodes and said electrooptic polymer define an active region of said waveguide structure extending along a portion of said waveguide core in said direction of propagation of said optical signal and said active region extends for at least about 0.5 cm and less than about 4 cm.

14. A method as claimed in claim 1 wherein said set of control electrodes and said electrooptic polymer define an active region of said waveguide structure extending along a portion of said waveguide core in said direction of propagation of said optical signal and respective signal transition regions are defined in the vicinity of an input portion and an output portion of said active region.

15. A method as claimed in claim 14 wherein said transition regions define a tapered waveguide core of decreasing cross-sectional dimension in the vicinity of said input portion of said active region and increasing cross-sectional dimension in the vicinity of said output portion of said active region.

16. A method as claimed in claim 14 wherein said transition regions define a periodically segmented waveguide core in the vicinity of said input portion of said active region and a periodically segmented waveguide core in the vicinity of said output portion of said active region.

17. A method as claimed in claim 1 wherein said waveguide structure comprises a phase delay structure and said relatively high index region of said electrooptic polymer is configured to introduce a phase delay in said coupled optical signal.

18. A method as claimed in claim 1 wherein:
said electrooptic polymer and said control electrode define an active region extending along a direction of propagation of said optical signal in said waveguide core; and
said waveguide structure defines a series of segmented active regions along said direction of propagation of said optical signal in said waveguide core.

19. A method as claimed in claim 18 wherein said series of segmented active regions are configured so as to alter different polarization modes of said optical signal.

20. A method of controlling the phase of an optical signal propagating along a waveguide, said method comprising:
providing a phase delay structure comprising a waveguide core, a cladding, an un-poled electrooptic polymers and a set of control electrodes, wherein
said un-poled electrooptic polymer is configured to define an index of refraction that varies under application of a suitable electric field generated by said control electrodes,
said polymer is selected such that said variation of said index of refraction is dominated by an electrooptic response resulting from the Kerr Effect,
said core, said cladding, and said electrooptic polymer are configured such that an increase in said index of refraction of said polymer causes a substantial portion of an optical signal propagating along said waveguide core to couple into a relatively high index region of said electrooptic polymer,
said high index region of said electrooptic polymer is configured to introduce a phase delay in said coupled optical signal;
said core, said cladding, and said electrooptic polymer are configured such that said coupled portion of said optical signal returns to said waveguide core;
operating said phase delay structure at a temperature at which chromophores of said un-poled electrooptic polymer are mobile;
generating said electric field in said electrooptic polymer by applying a DC driving voltage to said control electrodes; and
controlling said coupling of said optical signal by varying said DC driving voltage at said operating temperature of said phase delay structure, wherein said DC driving voltage is varied between a maximum value sufficient to increase said index of refraction of said un-poled electrooptic polymer through orientation of a substantial portion of said chromophores and a mininum value where said eleetrooptic polymer is configured to tend towards a less oriented state.

* * * * *

UNITED STATES PATENT AND TRADEMARK OFFICE
CERTIFICATE OF CORRECTION

PATENT NO. : 7,215,851 B2 Page 1 of 1
APPLICATION NO. : 11/268316
DATED : May 8, 2007
INVENTOR(S) : Richard W. Ridgway et al.

It is certified that error appears in the above-identified patent and that said Letters Patent is hereby corrected as shown below:

Col. 14, line 48, "configured such tat said" should read -- configured such that said --

Col. 14, line 55, "said un-poled electrooptie" should read -- said un-poled electrooptic --

Signed and Sealed this

Eleventh Day of December, 2007

JON W. DUDAS
*Director of the United States Patent and Trademark Office*